US010200791B1

(12) United States Patent
Liu et al.

(10) Patent No.: US 10,200,791 B1
(45) Date of Patent: Feb. 5, 2019

(54) OPERATION MODE SWITCH OF WIRELESS HEADPHONES

(71) Applicant: BESTECHNIC (SHANGHAI) CO., LTD., Shanghai (CN)

(72) Inventors: Junhong Liu, Shanghai (CN); Liang Zhang, Shanghai (CN); Weifeng Tong, Shanghai (CN); Fei Luo, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/992,127

(22) Filed: May 29, 2018

(30) Foreign Application Priority Data

Oct. 18, 2017 (CN) .......................... 2017 1 0971612

(51) Int. Cl.
*H04R 5/033* (2006.01)
*H04R 1/10* (2006.01)
(52) U.S. Cl.
CPC ........... *H04R 5/033* (2013.01); *H04R 1/1041* (2013.01); *H04R 2420/07* (2013.01)
(58) Field of Classification Search
CPC ... H04R 5/033; H04R 1/1041; H04R 2420/07
See application file for complete search history.

(56) References Cited

U.S. PATENT DOCUMENTS

| 2009/0197532 | A1* | 8/2009 | Wyper | H04M 1/6066 455/41.2 |
| 2012/0058727 | A1* | 3/2012 | Cook | H04R 5/02 455/41.3 |
| 2012/0231732 | A1* | 9/2012 | Kerselaers | H04B 5/0006 455/41.1 |
| 2016/0219358 | A1* | 7/2016 | Shaffer | H04R 1/1041 |
| 2017/0366924 | A1* | 12/2017 | Thoen | H04L 1/245 |
| 2018/0084456 | A1* | 3/2018 | Gostev | H04R 1/1016 |

* cited by examiner

*Primary Examiner* — Sonia L Gay
(74) *Attorney, Agent, or Firm* — Bayes PLLC

(57) ABSTRACT

Embodiments of wireless audio systems and methods for operation mode switch of wireless headphones are disclosed herein. In one example, a wireless audio system includes a first wireless headphone and a second wireless headphone. The first wireless headphone is configured to establish a first short-range wireless link with an audio source; transmit, to a second wireless headphone, link information associated with the first short-range wireless link; and remove the first short-range wireless link with the audio source in response to the second wireless headphone successfully establishing a second short-range wireless link with the audio source based on the link information. The second wireless headphone is configured to receive, from the first wireless headphone, the link information associated with the first short-range wireless link; and establish the second short-range wireless link with the audio source based on the link information.

8 Claims, 10 Drawing Sheets

OPERATION MODE SWITCH OF WIRELESS HEADPHONES

CROSS-REFERENCE TO RELATED APPLICATIONS

This application claims the benefit of priority to Chinese Patent Application No. 201710971612.9 filed on Oct. 18, 2017, which is incorporated herein by reference in its entirety.

BACKGROUND

Embodiments of the present disclosure relate to wireless audio systems.

Loudspeakers, including headphones, have been widely used in daily life. Headphones are a pair of small loudspeaker drivers worn on or around the head over a user's ears, which convert an electrical signal to a corresponding acoustic signal.

Wired headphones, however, constrain the users' movement because of the wires (cords), and are particularly inconvenient during exercise. Conventional wireless headphones no longer need the wires between the headphones and the audio sources, but still require the wires between the left and right headphones.

SUMMARY

Embodiments of wireless audio systems and methods for operation mode switch of wireless headphones are disclosed herein.

In one example, a wireless audio system includes a first wireless headphone and a second wireless headphone. The first wireless headphone is configured to establish a first short-range wireless link with an audio source; transmit, to a second wireless headphone, link information associated with the first short-range wireless link; and remove the first short-range wireless link with the audio source in response to the second wireless headphone successfully establishing a second short-range wireless link with the audio source based on the link information. The second wireless headphone is configured to receive, from the first wireless headphone, the link information associated with the first short-range wireless link; and establish the second short-range wireless link with the audio source based on the link information.

In another example, a wireless audio system includes a first wireless headphone and a second wireless headphone. The first wireless headphone is configured to establish a first short-range wireless link with an audio source; transmit, to a second wireless headphone, link information associated with the first short-range wireless link; and receive, from the audio source, audio information over the first short-range wireless link. The second wireless headphone is configured to receive, from the first wireless headphone, the link information associated with the first short-range wireless link; establish a second short-range wireless link with the audio source based on the link information; and snoop the audio information over the first short-range wireless link using the second short-range wireless link.

In a different example, a method for operation mode switch of wireless headphones is disclosed. A first short-range wireless link is establishing, by a first wireless headphone, with an audio source. Link information associated with the first short-range wireless link is transmitted by the first wireless headphone. The link information is received by a second wireless headphone. A second short-range wireless link is established, by the second wireless headphone, with the audio source based on the link information. The first short-range wireless link with the audio source is removed, by the first wireless headphone, in response to the second wireless headphone successfully establishing the second short-range wireless link with the audio source.

In another example, a method for snooping wireless audio communication is disclosed. A first short-range wireless link is established, by a first wireless headphone, with an audio source. Link information associated with the first short-range wireless link is transmitted by the first wireless headphone. The link information is received by a second wireless headphone. A second short-range wireless link is established, by the second wireless headphone, with the audio source based on the link information. Audio information is received, by the first wireless headphone, from the audio source over the first short-range wireless link. The audio information over the first short-range wireless link is snooped, by the second wireless headphone, using the second short-range wireless link.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1A:
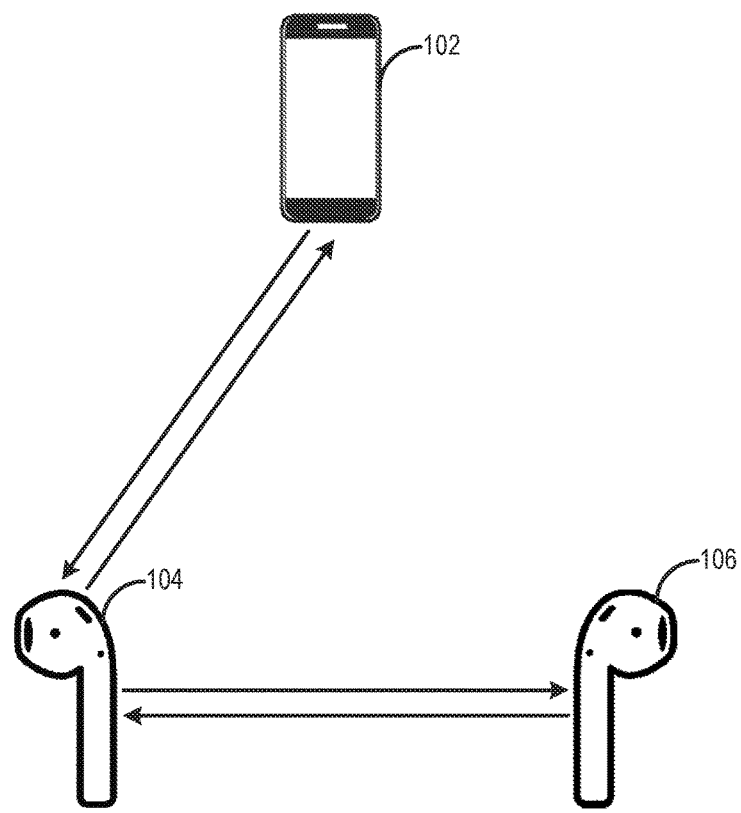
FIGS. 1A and 1B are block diagrams illustrating an exemplary wireless audio system in accordance with various embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

True wireless stereo (TWS) headphones (also known as untethered headphones) is a type of wireless headphones that remove the wires between the left and right headphones. In some TWS headphones, a primary wireless headphone can simultaneously communicate with an audio source and a secondary wireless headphone. For example, the audio source transmits data (music, audio, or data packets) to the primary wireless headphone using Bluetooth, and the primary wireless headphone then forwards the data to the secondary wireless headphone. This approach can cause high power consumption of the primary wireless headphone. Also, the relay of audio data by the primary wireless headphone may also cause audio stuttering and lagging due to additional latency and interference, thereby affecting user experience.

As will be disclosed in detail below, among other novel features, the wireless audio systems disclosed herein can achieve "true wireless stereo" with improved user experience and reduced headphone power consumption. The primary and secondary wireless headphones can switch their operation modes (e.g., primary mode and secondary mode) in a seamless manner without any disconnection of the primary wireless headphone with the audio source. As a result, the power consumption of the primary and secondary wireless headphones can be balanced without interrupting the audio play. In some embodiments, the switch of operation mode between the primary and secondary wireless headphones can occur promptly, such as less than 100 milliseconds (ms), and have good robustness (i.e., both wireless headphones can resume the initial states in case the switch fails).

In some embodiments of the present disclosure, the primary wireless headphone can establish a normal short-range wireless link with the audio source to receive the audio data (e.g., stereo audio), while the secondary wireless headphone can establish a snoop short-range wireless link with the audio source to snoop communications on the normal short-range wireless link and receive the audio data from the audio source as well. Having the secondary wireless headphone work in the snoop mode can reduce the power consumption of the primary wireless headphone and the audio stuttering and lagging because the primary wireless headphone no longer needs to forward the audio data to the secondary wireless headphone. The primary and secondary wireless headphones can switch their operation modes (e.g., node mode and snoop mode) as well.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1A is a block diagram illustrating an exemplary wireless audio system 100 in accordance with an embodiment. Wireless audio system 100 may include an audio source 102, a primary wireless headphone 104, and a secondary wireless headphone 106. Audio source 102 may be any suitable device that can provide audio information including, for example, music or voice in the digital or analog format. Audio source 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. Primary wireless headphone 104 and secondary wireless headphone 106 may be a pair of loudspeakers that can be worn on or around the head over a user's ears. Primary wireless headphone 104 and secondary wireless headphone 106 may be any electroacoustic transducers that convert an electrical signal (e.g., representing the audio information provided by audio source 102) to a corresponding sound. In some embodiments, each primary wireless headphone 104 and secondary wireless headphone 106 may be an earbud (also known as earpiece) that can plug into the user's ear canal. In some embodiments, primary wireless headphone 104 and secondary wireless headphone 106 may be TWS headphones, which are individual units that are not physically held by a band over the head and/or electrically connected by a cord. Primary wireless headphone 104 and/or secondary wireless headphone 106 may be combined with a microphone to form a headset according to some embodiments. It is understood that although in FIG. 1, wireless audio system 100 includes both audio source 102 and the pair of primary and secondary wireless headphones 104 and 106, in some embodiments, wireless audio system 100 may include only primary wireless headphone 104 and secondary wireless headphone 106.

As shown in FIG. 1, bidirectional communications may be achieved between audio source 102 and primary wireless headphone 104 over a short-range wireless link and between primary wireless headphone 104 and secondary wireless headphone 106 over another short-range wireless link. Audio source 102 may transmit audio information (e.g., in data packets) by a carrier wave at a first frequency to primary wireless headphone 104. In some embodiments, audio information may be a stream of audio stereo information in the form of compressed or uncompressed stereo samples for first and second audio channels, such as left-channel audio information and right-channel audio information or the like. Primary wireless headphone 104 may transmit acknowledgement packets back to audio source 102 upon successful reception of the audio information from audio source 102.

In some embodiments, audio information may be transmitted from audio source 102 to primary wireless headphone 104 according to the Bluetooth protocol at the working RF band between 2402 MHz and 2480 MHz or between 2400 MHz and 2483.5 MHz (referred to herein as "2.4 GHz"). Bluetooth is a wireless technology standard for exchanging data over short distances, and the Bluetooth protocol is one example of short-range wireless communication protocols. In some embodiments, audio information may be transmitted by audio source 102 to primary wireless headphone 104 according to the WiFi protocol at the working RF band of 2.4 GHz or 5 GHz. WiFi is a wireless technology for wireless local area networking based on the IEEE 802.11 standards, and the WiFi protocol (also known as the 802.11 protocol) is another example of short-range wireless communication protocol. It is understood that the short-range wireless link between audio source 102 and primary wireless headphone 104 may be any other suitable short-range wireless link in addition to Bluetooth and WiFi. In some embodiments, primary wireless headphone 104 may be configured as a left-channel headphone or a right-channel headphone for playing the corresponding left-channel or right-channel audio information extracted from the audio information received from audio source 102.

Primary wireless headphone 104 may transmit audio information (e.g., in data packets) by a carrier wave a second frequency that is the same as or different from (e.g., lower than) the first frequency to secondary wireless headphone 106. In some embodiments, the audio information transmitted from primary wireless headphone 104 to secondary wireless headphone 106 may be one of the left-channel or right-channel audio information depending on whether secondary wireless headphone 106 is configured as a left-channel headphone or a right-channel headphone. Secondary wireless headphone 106 may not communicate with audio source 102 directly, but instead, receive audio information forwarded by primary wireless headphone 104. In some embodiments, primary wireless headphone 104 may transit other type of data, such as link information associated with the short-range wireless link with audio source 102, to secondary wireless headphone 106. Link information may include, but not limited to, the address of audio source 102 (e.g., the IP address or media access control (MAC) address) and the encryption parameters and frequency-hopping spread spectrum (FHSS) parameters between audio source 102 and primary wireless headphone 104. Secondary wireless headphone 106 may transmit acknowledgement packets back to primary wireless headphone 104 upon successful reception of the audio information from primary wireless headphone 104.

Consistent with the disclosures of the present application, primary wireless headphone 104 and secondary wireless headphone 106 may have the same hardware structures, but in different operation modes. That is, the same headphone can work as either primary wireless headphone 104 or secondary wireless headphone 106 depending on its operation mode, e.g., primary mode or secondary mode. As disclosed below in detail, primary wireless headphone 104 and secondary wireless headphone 106 may switch their operation modes upon. That is, primary wireless headphone 104 may switch to the secondary mode to become a secondary wireless headphone, while at the same time, secondary wireless headphone 106 may switch to the primary node to become a primary wireless headphone.

Figure 1B:
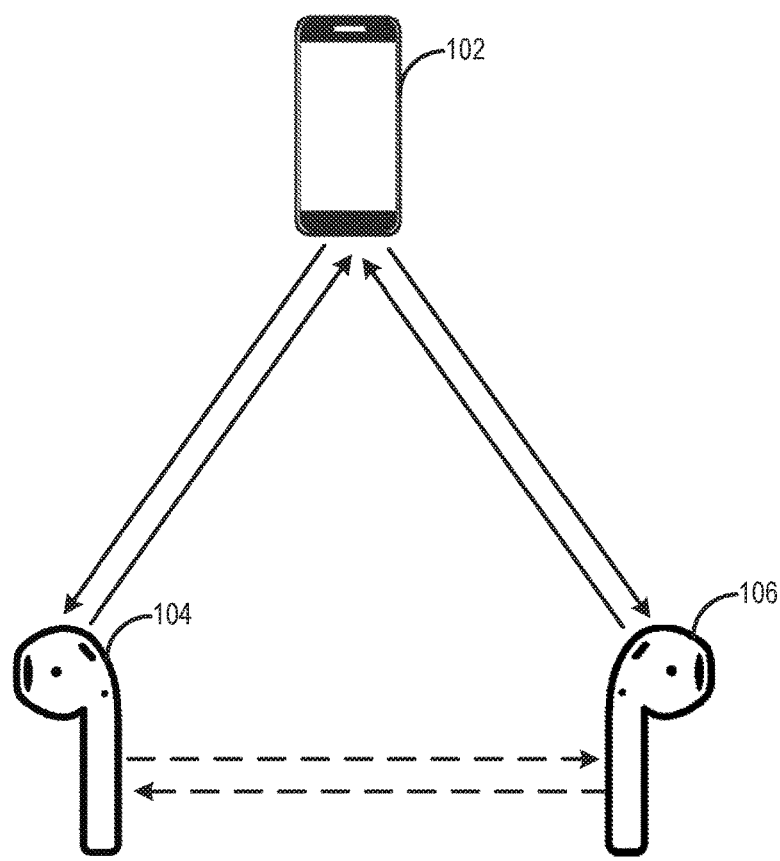

FIG. 1B is a block diagram illustrating exemplary wireless audio system 100 in accordance with another embodiment. The same functions of audio source 102, primary wireless headphone 104, and secondary wireless headphone 106 that have been described above with respect to FIG. 1A will not be repeated with respect to FIG. 1B.

As shown in FIG. 1B, bidirectional communications may be established between audio source 102 and primary wireless headphone 104 and between audio source 102 and secondary wireless headphone 106. In some embodiments, a normal bidirectional short-range wireless link may be established between audio source 102 and primary wireless headphone 104 using a short-range wireless communication protocol (e.g., the Bluetooth or WiFi protocol). That is, primary wireless headphone 104 may work in the normal mode. In the normal mode, primary wireless headphone 104 may receive audio information (e.g., in data packets) transmitted by a carrier wave from audio source 102 via the normal short-rang wireless link. Primary wireless headphone 104 may transmit messages back to audio source 102 in response to the reception of the audio information from audio source 102.

In some embodiments, a snoop bidirectional short-range wireless link may be established between audio source 102 and secondary wireless headphone 106 using the same short-range wireless communication protocol (e.g., the Bluetooth or WiFi protocol). That is, secondary wireless headphone 106 may work in the snoop mode in which the connection with secondary wireless headphone 106 may not be known by audio source 102. In the snoop mode, secondary wireless headphone 106 may snoop (also known as listen or otherwise eavesdrop) the communications between audio source 102 and primary wireless headphone 104 over the normal short-rang wireless link. By snooping the communications between audio source 102 and primary wireless headphone 104, secondary wireless headphone 106 may also receive the audio information (e.g., in data packets) transmitted by the carrier wave from audio source 102 using the snoop short-rang wireless link. In some embodiments, secondary wireless headphone 106 may transmit messages back to audio source 102 in response to the reception of the audio information from audio source 102.

As shown in FIG. 1B, to enable secondary wireless headphone 106 work in the snoop mode, primary wireless headphone 104 may transmit, to secondary wireless headphone 106, link information associated with the normal short-rang wireless link between audio source 102 and primary wireless headphone 104. The Link information may include, but are not limited to, the address of audio source 102 (e.g., the IP address or MAC address) and the encryption parameters and FHSS parameters between audio source 102 and primary wireless headphone 104.

Upon receiving the link information from primary wireless headphone 104, secondary wireless headphone 106 can establish the snoop short-rang wireless link with audio source 102 based on the link information. For example, secondary wireless headphone 106 may pretend to be primary wireless headphone 104 so that primary audio source 102 does not recognize secondary wireless headphone 106 as a newly-connected device and thus, will not disconnect and reconnect with secondary wireless headphone 106. In some embodiments, secondary wireless headphone 106 may transmit any suitable messages to primary wireless headphone 104.

Wireless audio system 100 in FIGS. 1A and 1B can support voice calls. For example, the audio information transmitted by audio source 102 may be voice information. At least one of primary and secondary wireless headphones 104 and 106 may be combined with a microphone to collect user voice and generate voice information during the voice calls. Primary wireless headphone 104 and secondary wireless headphone 106 may transmit microphone audio information (e.g., the voice information) to audio source 102 using the same short-range wireless communication protocol, such as the Bluetooth or WiFi protocol, over the bidirectional short-range wireless links. In some embodiments (as shown in FIG. 1B), secondary wireless headphone 106 may transmit the voice information to audio source 102 via the established snoop bidirectional communication link with audio source 102 during the voice calls. As described below in detail, each of primary and secondary wireless headphones 104 and 106 may be combined with a respective microphone. The enabled microphone (and the upstream link thereof) may be switched between primary and secondary wireless headphones 104 and 106 promptly to maintain the continuous collection of user voice during the voice calls even one of primary and secondary wireless headphones 104 and 106 is not working appropriately.

Figure 2:
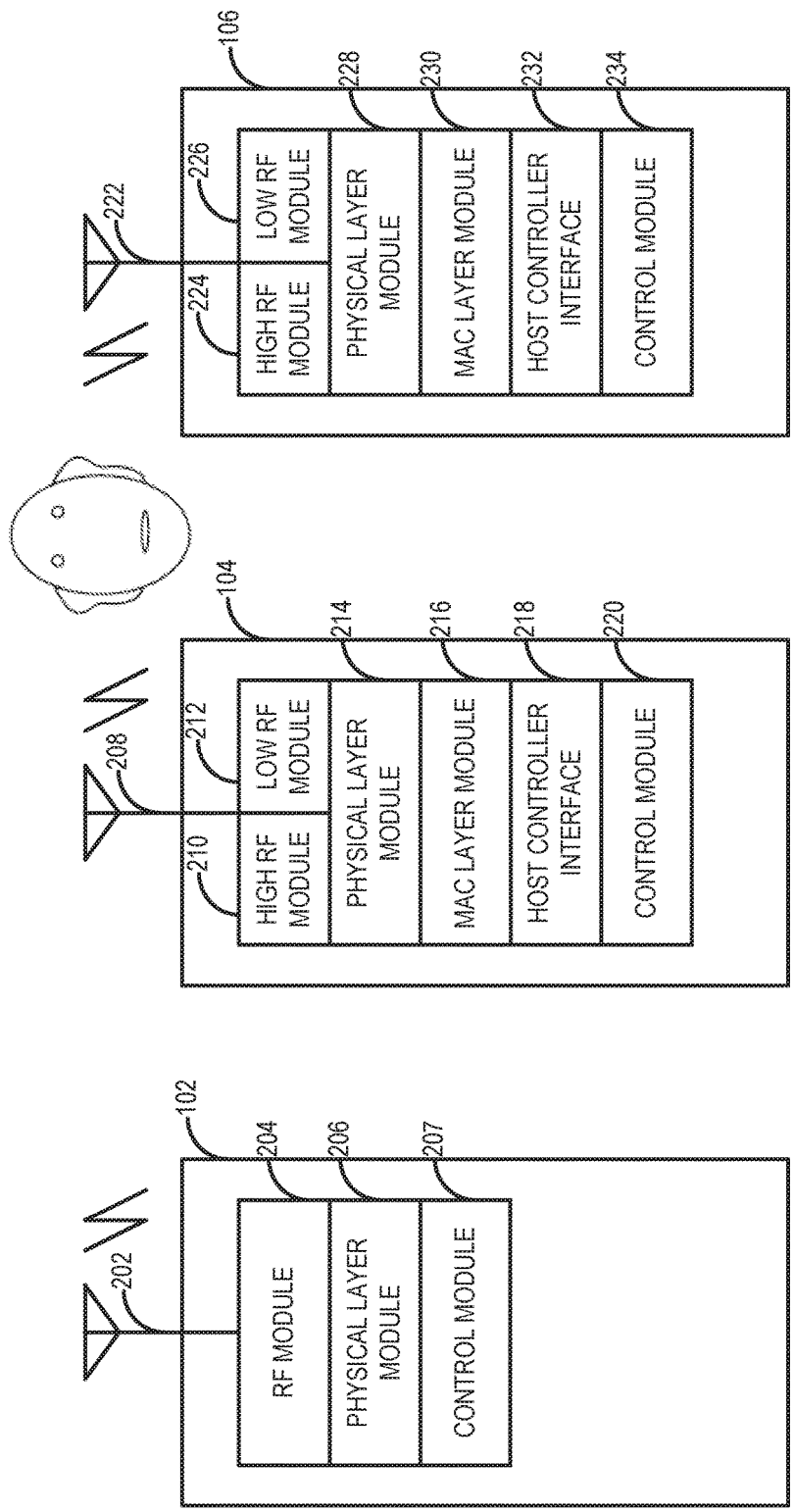
FIG. 2 is a detailed block diagram illustrating the exemplary wireless audio system in FIGS. 1A and 1B in accordance with an embodiment.

FIG. 2 is a detailed block diagram of exemplary wireless audio system 100 in FIGS. 1A and 1B in accordance with an embodiment. Audio source 102 in this example includes an antenna 202, an RF module 204, a physical layer module 206, and a control module 207. It is understood that additional module(s) may be included in audio source 102, either in the same IC chip in which RF module 204, physical layer module 206, and control module 207 are formed or in a separate IC chip.

Antenna 202 may include an array of conductors for transmitting and receiving radio waves at one or more RF bands corresponding to RF module 204. For example, antenna 202 may transmit audio information modulated by a carrier wave using RF module 204. As described above, the audio information may be any music and/or voice information provided by audio source 102. For example, the audio information may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels). Antenna 202 may receive messages modulated by a carrier wave. For example, the messages may be any messages used for acknowledging the reception of the audio information by primary wireless headphone 104 or secondary wireless headphone 106, such as acknowledgement (ACK), negative acknowledgement (NACK), partial acknowledgement (ACK_P), or interfering packets. Antenna 202 may also receive microphone audio information (e.g., modulated voice data collected by a microphone) during voice calls.

RF module 204, physical layer module 206, and control module 207 may be in the same integrated circuit (IC) chip that implements a short-range wireless communication protocol, such as the Bluetooth protocol or WiFi protocol. RF module 204 may be configured to modulate the audio information using the carrier wave at the first frequency, for example, at 2.4 GHz for Bluetooth or WiFi communication, and transmit the audio information at the first frequency via antenna 202. RF module 204 may be further configured to receive and demodulate the messages and/or the audio information (e.g., the voice information during voice calls) from the carrier wave at the first frequency, for example, at 2.4 GHz. Physical layer module 206 may be configured to generate the physical link (baseband) between audio source 102 and primary wireless headphone 104 (and secondary wireless headphone 106 even though audio source 102 may not be aware of the connection with secondary wireless headphone 106) according to the short-range wireless communication protocol. For example, physical layer module 206 may generate baseband packets (e.g., Bluetooth packets) based on the music and/or voice data (payload) and perform error correction using any known methods, such as forward error correction (FEC) and automatic repeat request (ARQ).

Control module 207 may be configured to determine the re-transmission of audio information based on the messages received from primary wireless headphone 104 and secondary wireless headphone 106. In some embodiments, the transmission of the audio information may occur at the audio data packet level in time slots. For example, according to the Bluetooth protocol, the physical channel of the Bluetooth connection is divided into time slots, each of which has the same length (e.g., 625 μs). RF module 204 in conjunction with antenna 202 may transmit an audio data packet (N) in a time slot (N). Based on the receptions of the audio data packet (N) in the time slot (N) at primary wireless headphone 104 and secondary wireless headphone 106, in the subsequent time slot (N+1), RF module 204 in conjunction with antenna 202 may receive a message from primary wireless headphone 104 alone, or messages from both primary wireless headphone 104 and secondary wireless headphone 106, which are generated in response to the reception status of the audio data packet (N) in the time slot (N).

Control module 207 may control RF module 204 and antenna 202 to re-transmit the audio data packet (N) in the subsequent time slot (N+1) unless the ultimate message received is a complete ACK packet. For example, if the ultimate message received is not a complete ACK packet (e.g., a NACK packet, a partial packet, or an interfered packet), then control module 207 controls RF module 204 to re-transmit the audio data packet (N) in the subsequent time slot (N+1). In some embodiments when primary wireless headphone 104 is in the normal mode and secondary wireless headphone 106 is in the snoop mode, control module 207 may repeatedly receive a NACK message from primary wireless headphone 104 and thus, re-transmit the audio information (e.g., voice data during voice calls) until the number of re-transmission reaches a threshold. The threshold of re-transmission times may be 2, 3, 4, 5, etc. As a result, secondary wireless headphone 106 may not need to transmit any acknowledgement message to either audio source 102 or primary wireless headphone 104 assuming the probability of secondary wireless headphone 106 not successfully receiving the audio message within the threshold of re-transmission times is very low.

Primary wireless headphone 104 in this example may include a wireless transceiver (primary wireless transceiver) configured to receive the audio information transmitted by audio source 102 at the first frequency and transmit the message in response to the reception of the audio information to audio source 102 and microphone audio information during voice calls at the first frequency. The wireless transceiver may be further configured to transmit link information to secondary wireless headphone 106 (and receive messages from secondary wireless headphone 106 in some embodiments) at the second frequency. Primary wireless headphone 104 may include other components, such as an enclosure, speakers, and a microphone (not shown). Primary wireless transceiver may include an antenna 208, a high RF module 210, a low RF module 212, a physical layer module 214, a MAC layer module 216, a host controller interface (HCI) 218, and a control module 220. Some or all of the modules mentioned above may be integrated in the same IC chip to reduce the chip size and/or power consumption. Primary wireless headphone 104 may present at least part of the audio information received from audio source 102 to the user via one of the user's ear. For example, the speaker of primary wireless headphone 104 may play music and/or voice based on the entire audio information or one audio channel of the audio information.

Antenna 208 may include an array of conductors for transmitting and receiving radio waves at two or more RF bands corresponding to high RF module 210 and low RF module 212. High RF module 210 may be configured to receive, from audio source 102, audio information and transmit, to audio source 102, messages (e.g., ACK, NACK, or ACK_P packet) at the first frequency via antenna 208. In some embodiments, high RF module 210 may be further configured to transmit, to audio source 102, another audio information (e.g., microphone audio information) at the first frequency via antenna 208. Low RF module 212 may be configured to transmit, to secondary wireless headphone 106, the link information at the second frequency lower than the first frequency via antenna 208. In some embodiments, low RF module 212 may be further configured to receive, from secondary wireless headphone 106, messages at the second frequency via antenna 208. Both high RF module 210 and low RF module 212 may implement substantially the same short-range wireless communication protocol for short-range wireless communications at different RF bands. It is understood that in some embodiments, the first and second frequencies may be the same, e.g., 2.4 GHz for Bluetooth or WiFi communications, and high RF module 210 may replace low RF module 212 for communications with secondary wireless headphone 106.

Physical layer module 214 may be configured to generate the physical links (baseband) between audio source 102 and primary wireless headphone 104 according to the short-range wireless communication protocol used by high RF module 210 and low RF module. For example, physical layer module 214 may generate baseband packets (e.g., Bluetooth packets) based on the music and/or voice data (payload) and perform error correction using any known methods, such as FEC and ARQ. MAC layer module 216 may be configured to generate the logical data channel links between audio source 102 and primary wireless headphone 104 according to the short-range wireless communication protocol. For example, MAC layer module 216 may generate link control channel, link manager channel, user asynchronous channel, user isochronous channel, and user synchronous channel based on the Bluetooth protocol (and the amended Bluetooth protocol). HCI 218 may be configured to provide a common interface to physical layer module 214 and MAC layer module 216 and access to hardware status and control registers. For example, when implementing the Bluetooth protocol (and the amended Bluetooth protocol), HCI 218 may provide a uniform method of accessing the Bluetooth baseband capabilities.

In this example, primary wireless headphone 104 is referred to as "primary" because audio source 102 recognizes the connection with primary wireless headphone 104. In some embodiments, control module 220 may control primary wireless headphone 104 to switch to the snoop mode (i.e., snooping audio information transmitted to another wireless headphone) or to the secondary mode (i.e., receiving relayed audio information from another wireless headphone) to become a "secondary" headphone. In some embodiments, control module 220 may determine whether to switch the operation mode of primary wireless headphone 104 based on one or more parameters associated with primary wireless headphone 104 and/or secondary wireless headphone 106, such as signal quality and/or power consumption. In one example, control module 220 may determine whether the signal quality (e.g., signal-to-noise ratio (SNR) or received signal strength indicator (RSSI)) is above a threshold and cause primary wireless headphone 104 to switch to the snoop mode when the signal quality becomes better than the signal quality of secondary wireless headphone 106. That is, in some embodiments, the wireless headphone with the relatively poor signal quality may be used as the primary wireless headphone working in the normal mode, while the wireless headphone with the relatively good signal quality may be used as the secondary wireless headphone working in the snoop mode, so that the ACK packets transmitted by the primary wireless headphone can be more easily interfered by the interfering packets transmitted by the secondary wireless headphone. The signal quality of the secondary wireless headphone is better than the signal quality of the primary wireless headphone. In another example, control module 220 may use the relative power consumption between primary and secondary wireless headphones 104 and 106 to determine whether to cause primary wireless headphone 104 to switch to the secondary mode as a wireless headphone consumes more power in the primary mode than in the secondary mode.

Control module 220 may be further configured to determine the message indicative of whether the audio information is successfully received by primary wireless headphone 104. In some embodiments, the message may be an ACK packet indicative of the successful reception of the audio information from audio source 102 or may be a NACK packet indicative of the unsuccessful reception of the audio information from audio source 102. As described above with respect to control module 207 of audio source 102, in some embodiments, control module 220 may control primary wireless headphone 104 to repeatedly transmit a NACK message to audio source 102 to cause audio source 102 to re-transmit the audio information until the number of re-transmission reaches a threshold (e.g., 2, 3, 4, 5, etc.)

Secondary wireless headphone 106 in this example may include a wireless transceiver (secondary wireless transceiver) configured to receive (snoop) the audio information transmitted by audio source 102 and transmit a message (e.g., an ACK_P or interfering packet) and microphone audio information during voice calls to audio source 102 at the first frequency (high RF, e.g., 2.4 GHz). The wireless transceiver may be further configured to receive the link information from primary wireless headphone 104 (and transmit the message to primary wireless headphone 104 in some embodiments) at the second frequency (low RF, e.g., 10 MHz). Secondary wireless headphone 106 may include other components, such as an enclosure, speakers, and a microphone (not shown). Secondary wireless transceiver may include an antenna 222, a high RF module 224, a low RF module 226, a physical layer module 228, a MAC layer module 230, an HCI 232, and a control module 234. Some or all of the modules mentioned above may be integrated in the same IC chip to reduce the chip size and/or power consumption. Secondary wireless headphone 106 may present at least part of the audio information to the user via one of the user's ear. For example, the speaker of secondary wireless headphone 106 may play music and/or voice based on the audio information or one audio channel of the audio information.

In this example, secondary wireless headphone 106 has the same hardware structures as primary wireless headphone 104. The functions of each module mentioned above in secondary wireless headphone 106 are the same as the counterparts in primary wireless headphone 104 and thus, will not be repeated. Different from primary wireless headphone 104, secondary wireless headphone 106 in this example works in the snoop mode or the secondary mode, so that audio source 102 may not recognize the connection with secondary wireless headphone 106. To enable secondary wireless headphone 106 to work in the snoop mode or the secondary mode, in some embodiments, low RF module 212 of primary wireless headphone 104 may transmit, to low RF module 226 of secondary wireless headphone 106, link information associated with the short-range wireless link between audio source 102 and primary wireless headphone 104. The link information may include any parameters necessary for enabling secondary wireless headphone 106 to snoop the communications between audio source 102 and primary wireless headphone 104, such as the address of audio source 102 (e.g., the IP address or MAC address) and the encryption parameters and FHSS parameters used between audio source 102 and primary wireless headphone 104. It is understood that in some embodiments, the first and second frequencies may be the same, e.g., 2.4 GHz for Bluetooth or WiFi communications, and high RF module 224 may replace low RF module 226 for communications with primary wireless headphone 104.

As described above, similar to control module 220 of primary wireless headphone 104, control module 234 of secondary wireless headphone 106 may switch secondary wireless headphone 106 into the normal mode or primary mode to become a "primary" headphone. The switch may be determined based on one or more parameters, such as the relative signal quality and/or relative power consumption between primary wireless headphone 104 and secondary wireless headphone 106. For example, both control modules 220 and 234 may work together to switch the operation modes of primary wireless headphone 104 and secondary wireless headphone 106 to improve the overall performance of the pair of wireless headphones 104 and 106 as described above in detail.

Control module 234 may be further configured to determine the messages to be transmitted to audio source 102 (and primary wireless headphone 104 in some embodiments) by secondary wireless headphone 106. In some embodiments, control module 234 may control low RF module 226 to transmit a message when the audio information is successfully snooped by high RF module 224 of secondary wireless headphone 106. The message may be an ACK_P packet (a partial-acknowledgement packet) that forms a complete ACK packet with the ACK_P packet transmitted by primary wireless headphone 104 indicative of the successful reception of the audio information by primary wireless headphone 104. On the other hand, when the audio information is not successfully snooped by high RF module 224 of secondary wireless headphone 106, control module 234 may prevent low RF module 226 from transmitting any message (e.g., ACK_P packet) to audio source 102. In some embodiments, control module 234 may control low RF module 226 to transmit a message when the audio information is not successfully snooped by high RF module 224 of secondary wireless headphone 106. The message may be an interfering packet that interferes with the reception of the first message from primary wireless headphone 104 at audio source 102. The interfering packet may include a complete or partial NACK packet and a complete or partial dedicated interfering packet. On the other hand, when the audio information is successfully snooped by high RF module 224 of secondary wireless headphone 106, control module 234 may prevent low RF module 226 from transmitting any message (e.g., interfering packet) to audio source 102.

In some embodiments, control module 234 may control low RF module 226 to transmit, to low RF module 212 of primary wireless headphone 104, a message indicative of whether secondary wireless headphone 106 successfully snoops the audio information from audio source 102. In one example, control module 220 of primary wireless headphone 104 then may control high RF module 210 of primary wireless headphone 104 to transmit a message to audio source 102 indicative of whether both primary and secondary wireless headphones 104 and 106 successfully receive the audio information. In another example, control module 220 of primary wireless headphone 104 then may control high RF module 210 of primary wireless headphone 104 to transmit a message to audio source 102 indicative of whether primary wireless headphone 104 successfully receives the audio information, and the power of the message may be adjusted based on the message received from secondary wireless headphone 106. For example, if the message received from secondary wireless headphone 106 indicates that secondary wireless headphone 106 fails to successfully snoop the audio information, then the power of the message transmitted by primary wireless headphone 104 to audio source 102 may be reduced from the normal level so that it can be more easily inferred by the message transmitted by secondary wireless headphone 106 to audio source 102 (with normal power level).

Figure 3:
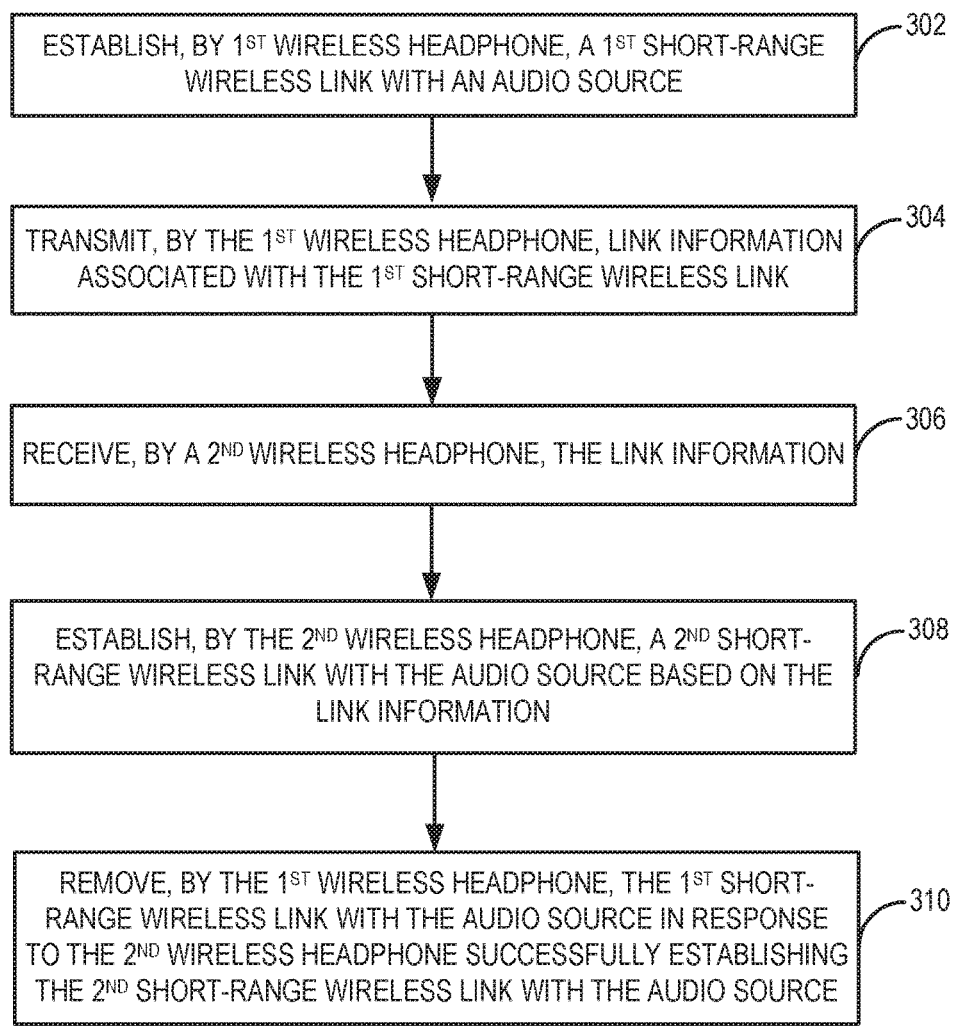
FIG. 3 is a flow chart illustrating an exemplary method for operation mode switch of wireless headphones in accordance with an embodiment.

FIG. 3 is a flow chart illustrating an exemplary method 300 for operation mode switch of wireless headphones in accordance with an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 3, as will be understood by a person of ordinary skill in the art. Method 300 will be described with reference to timing diagrams FIGS. 4A and 4B in accordance with various embodiments. However, method 300 is not limited to that exemplary embodiment. Method 300 may be performed according to the operation mode switch scheme between primary mode and secondary mode as disclosed herein.

Starting at 302, a first short-range wireless link is established by primary wireless headphone 104 with an audio source. The first short-range wireless link may be an asynchronous connectionless (ACL) link. ACL is a communication protocol used as a transmission link for data communication in Bluetooth. ACL link may be used when data integrity is more important than avoiding latency. The first short-range wireless link may be a bidirectional communication link for transmitting audio information or any other type of data (e.g., acknowledgement messages) between primary wireless headphone 104 and audio source 102.

Figure 4A:
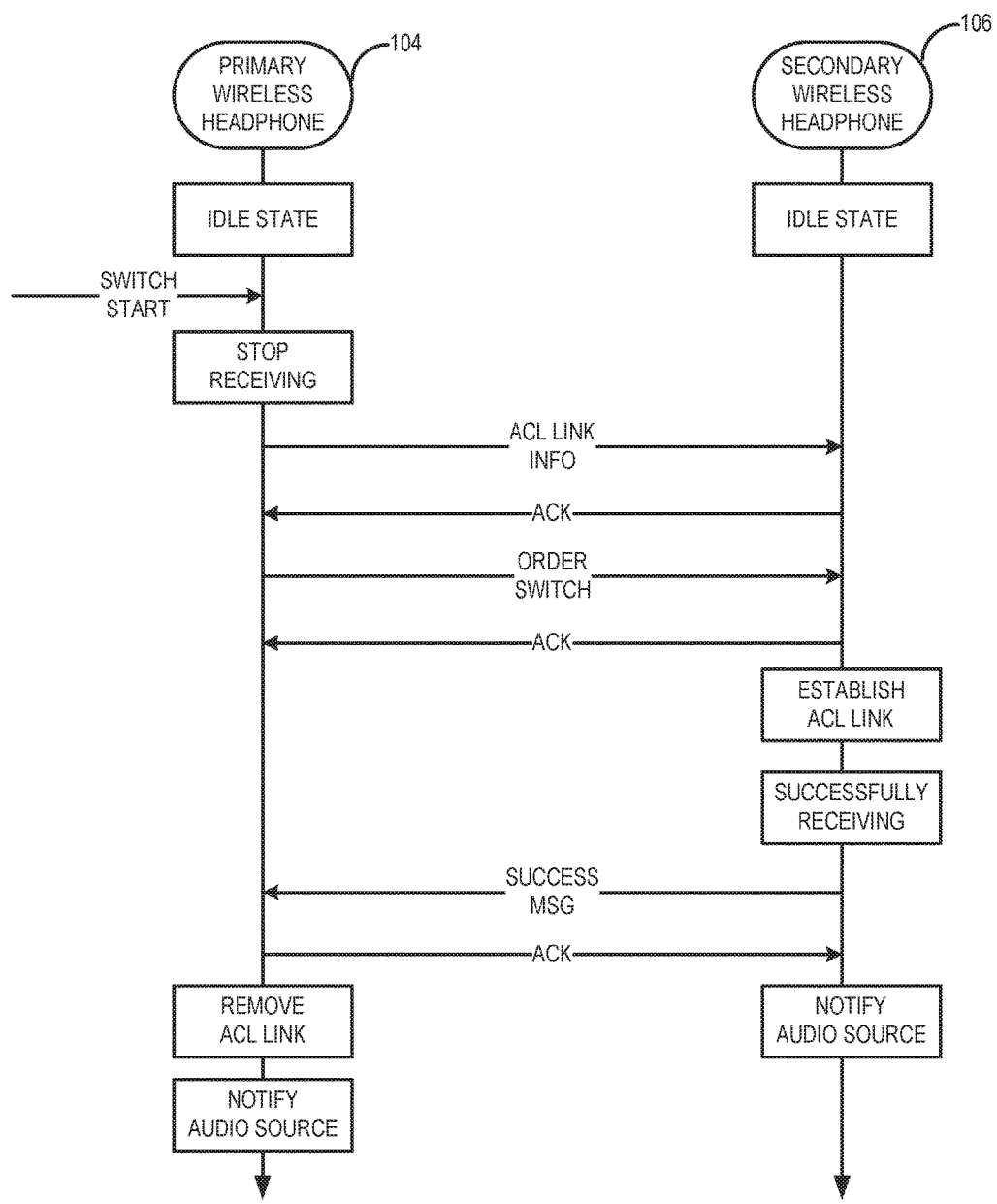
FIGS. 4A and 4B are timing diagrams illustrating operation mode switch of wireless headphones in accordance with various embodiments.
Figure 4B:
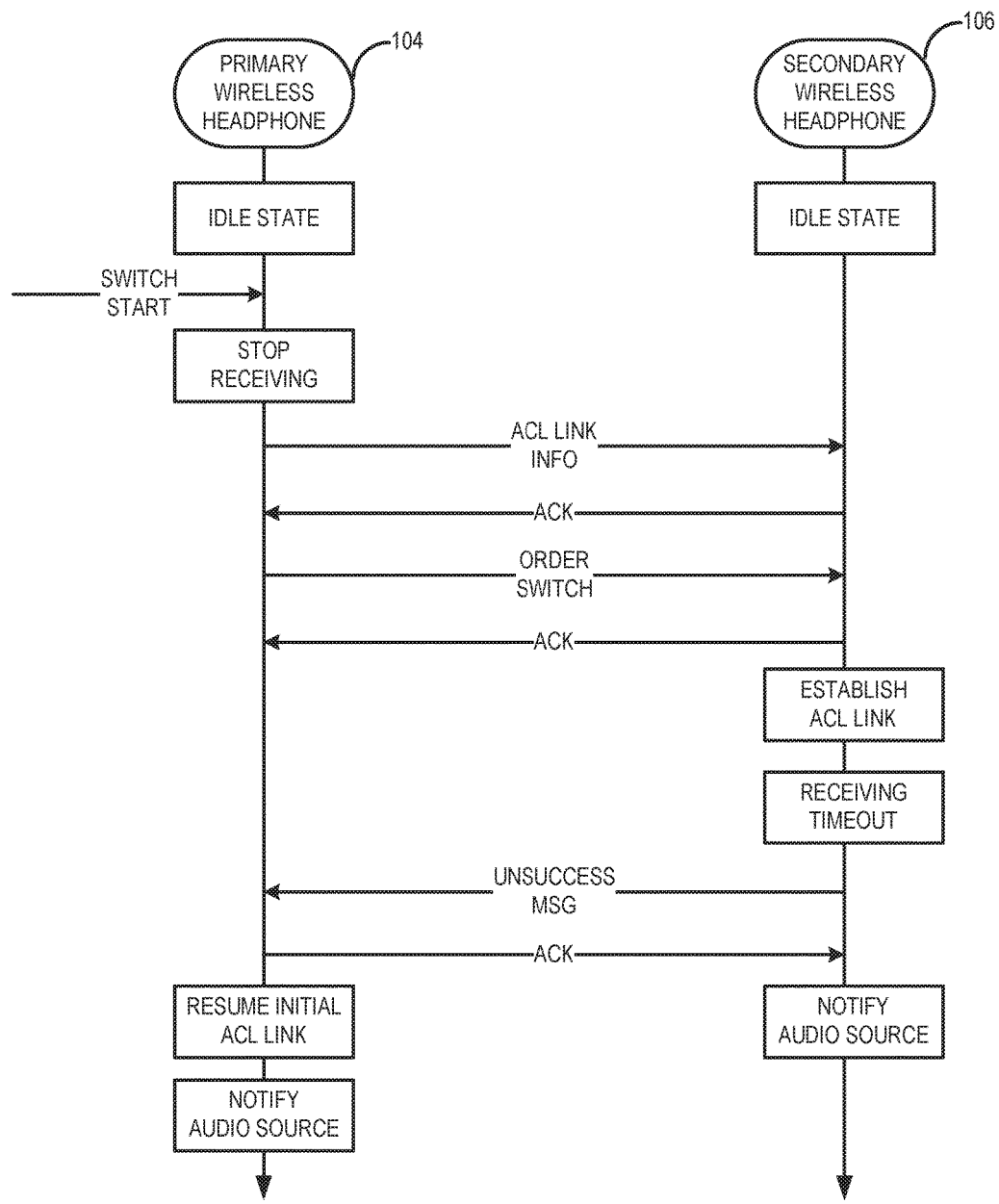

At 304, link information associated with the first short-range wireless link is transmitted by primary wireless headphone 104 to secondary wireless headphone 106. Referring now to FIGS. 4A and 4B, the link information may be ACL link information associated with the first ACL link between primary wireless headphone 104 and audio source 102. Any suitable information related to the first ACL link may be encapsulated into ACL data packages and transmitted to secondary wireless headphone 106. The ACL link information may include the connection parameters (e.g., the IP and/or MAC addresses), encryption parameters, and FHSS parameters with audio source 102. As shown in FIGS. 4A and 4B, the transmission of the ACL link information may be triggered in response to receiving an instruction (switch start) to switch operation modes of primary and secondary wireless headphones 104 and 106, for example, when certain conditions are met (e.g., the relative power consumptions as described above). The transmission of the ACL link information may occur when both primary and secondary wireless headphones 104 and 16 are in an idle state to avoid interrupting normal audio play. Primary wireless headphone 104 also stops receiving audio information from audio source 102 over the first ACL link prior to transmitting the ACL link information to secondary wireless headphone 106.

At 306, the link information is received by secondary wireless headphone 106. As shown in FIGS. 4A and 4B, secondary wireless headphone 106 receives the ACL link information from primary wireless headphone 104 and transmits a confirmation message (e.g., ACK) to primary wireless headphone 104 indicative of receiving the ACL link information. In response to receiving a positive confirmation message indicative of successfully receiving the ACL link information by secondary wireless headphone 106, primary wireless headphone 104 then transmits an order message (order switch) instructing secondary wireless headphone 106 to switch to the primary mode by establishing its own ACL link with audio source 102. The order message may be transmitted via the link manager protocol (LMP) in Bluetooth by primary wireless headphone 104. Upon receiving the order message, secondary wireless headphone 106 transmits an acknowledgment message (ACK) to primary wireless headphone 104.

At 308, a second short-range wireless link is established by secondary wireless headphone 106 with the audio source based on the link information. Similar to the first short-range wireless link, the second short-range wireless link between audio source 102 and secondary wireless headphone 106 may be a bidirectional communication link for transmitting audio information or any other type of data (e.g., acknowledgement messages) between primary wireless headphone 104 and audio source 102. As shown in FIGS. 4A and 4B, a second ACL link is established by secondary wireless headphone 106 with audio source 102 based on the ACL link information provided by primary wireless headphone 104. That is, to establish the second ACL link, audio source 102 may not need to provide any link information to secondary wireless headphone 106.

At 310, the first short-range wireless link with the audio source is removed by primary wireless headphone 104 in response to secondary wireless headphone 106 successfully establishing the second short-range wireless link with the audio source. In some embodiments, whether the second short-range wireless link with the audio source is successfully established by secondary wireless headphone 106 is determined based on whether secondary wireless headphone 106 can receive audio information from the audio source over the second short-range wireless link within a threshold period. The threshold period may be a preset timeout period. For example, as shown in FIG. 4A, secondary wireless headphone 106 receives audio information from audio source 102 over the second ACL link within the threshold period and then transmits a success message to primary wireless headphone 104, for example, via the LMP protocol, in response to the successful reception of the audio information. In response to receiving the success message, primary wireless headphone 104 transmits an acknowledgment message (ACK) to secondary wireless headphone 106 and removes the first ACL link with audio source 102. In this example, primary wireless headphone 104 further notifies audio source 102 about the removal of the first ACL link. On the other hand, in response to receiving the ACK from primary wireless headphone 104, secondary wireless headphone 106 also notifies audio source 102 about the establishment of the second ACL link. Accordingly, the operation modes (primary and secondary modes) are switched between primary and secondary wireless headphones 104 and 106, and secondary wireless headphone 106 now takes over the ACL link with audio source 102 and becomes the primary wireless headphone.

However, as shown in FIG. 4B, secondary wireless headphone 106 may not receive audio information from audio source 102 over the second ACL link within the threshold period, i.e., timeout. In response to the reception timeout, secondary wireless headphone 106 transmits an unsuccess message to primary wireless headphone 104, for example, via the LMP protocol. In response to receiving the unsuccess message, primary wireless headphone 104 transmits an acknowledgment message (ACK) to secondary wireless headphone 106 and resume the initial first ACL link with audio source 102 to continue receiving the audio information from audio source 102 over the first ACL link. In this example, primary and secondary wireless headphones 104 and 106 further notify audio source 102 about the failure of operation mode switch.

The operation mode switch scheme disclosed herein does not require active participation of audio source 102 in the process and does not require disconnection between primary wireless headphone 104 and audio source 102 prior to the connection between secondary wireless headphone 106 and audio source 102. Thus, the switch process can be very fast, e.g., less than 100 ms, to reduce audio stuttering and lagging. The switch process can also be very robust as it is easy to return to the initial modes for both primary and secondary wireless headphones 104 and 106 in case of switch failure.

Figure 5:
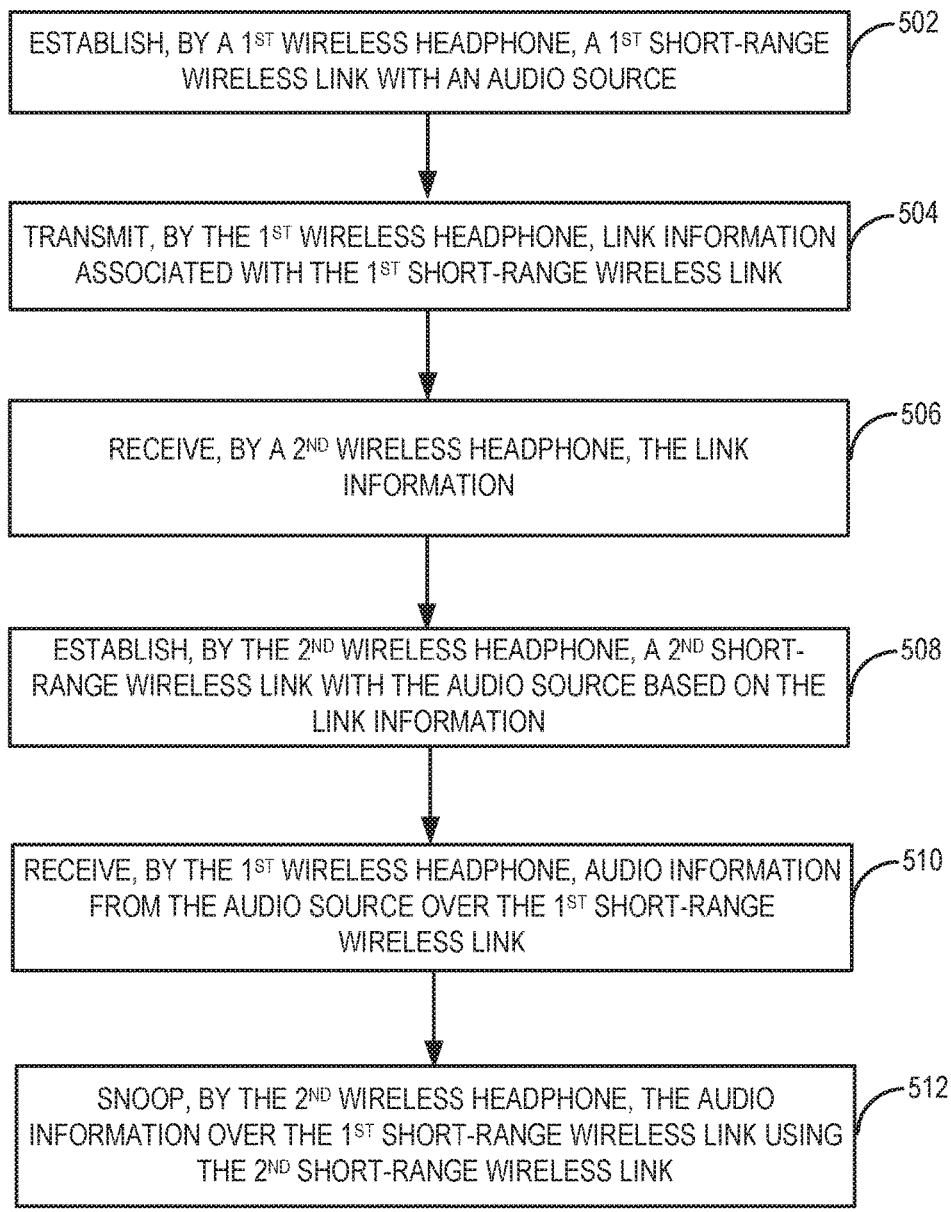
FIG. 5 is a flow chart illustrating an exemplary method for snooping wireless audio communication in accordance with an embodiment.

FIG. 5 is a flow chart illustrating an exemplary method 500 for snooping wireless audio communication in accordance with an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 5, as will be understood by a person of ordinary skill in the art. Method 500 will be described with reference to timing diagrams FIG. 6 in accordance with an embodiment. However, method 500 is not limited to that exemplary embodiment.

Starting at 502, a first short-range wireless link is established by primary wireless headphone 104 with an audio source. The first short-range wireless link may be a synchronous connection oriented (SCO) link. An SCO link is a set of reserved timeslots on an existing ACL link used for voice data. The first short-range wireless link may be a bidirectional communication link for transmitting audio information (e.g., voice data) between primary wireless headphone 104 and audio source 102.

Figure 6:
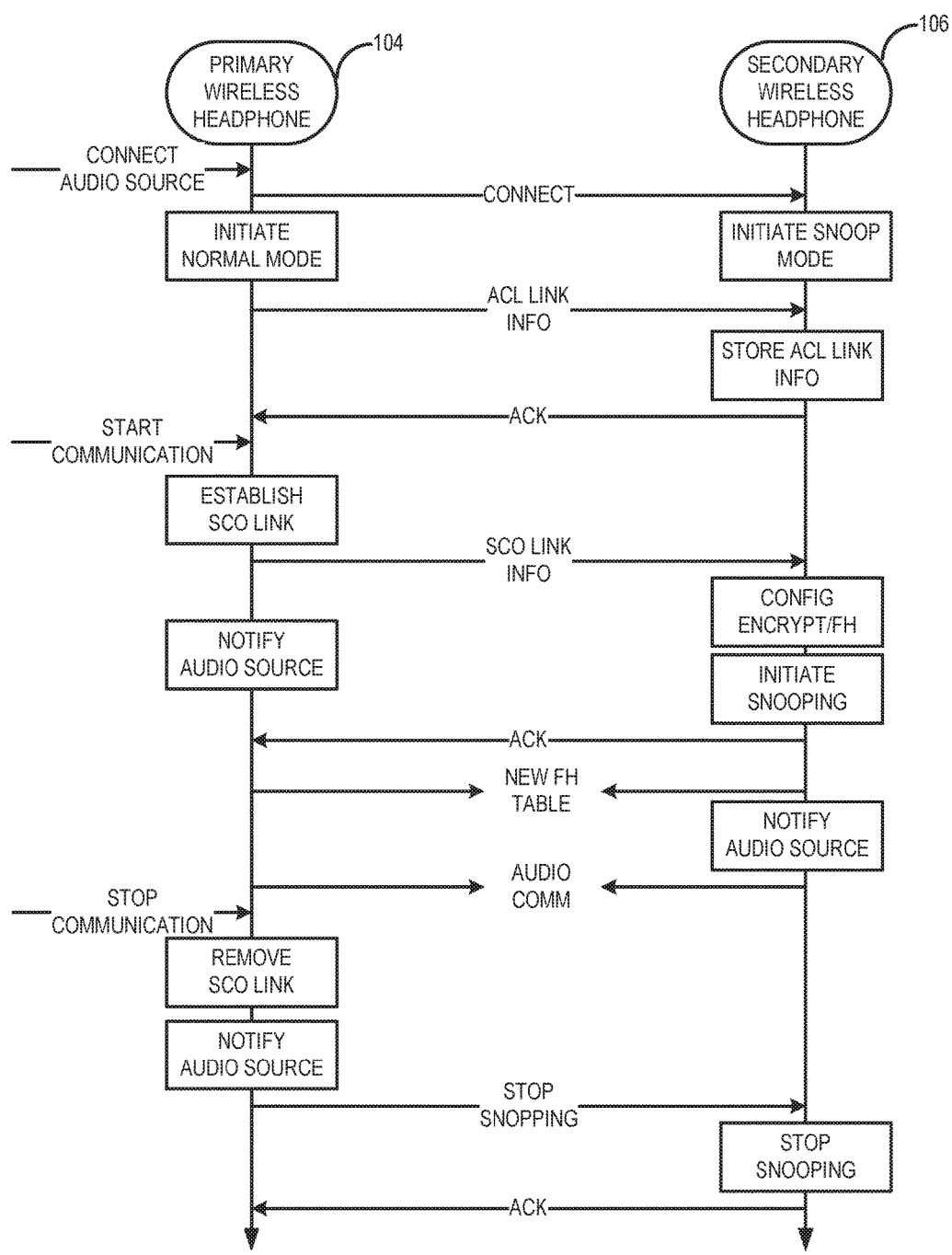
FIG. 6 is a timing diagram illustrating snooping of wireless audio communication in accordance with an embodiment.

Referring to FIG. 6, in this example, once primary wireless headphone 104 connects to audio source 102, primary wireless headphone 104 established a connection with secondary wireless headphone 106. Primary wireless headphone 104 and secondary wireless headphone 106 then initiate the normal mode and snoop mode, respectively. As described above in detail with respect to FIGS. 4A and 4B, primary wireless headphone 104 transmits the ACL link information to secondary wireless headphone 106. Secondary wireless headphone 106 stores the ACL link information and transmits an acknowledgment message (ACK) to primary wireless headphone 104. As shown in FIG. 6, once audio communications (e.g., voice calls) with audio source 102 start, primary wireless headphone 104 establishes a first SCO link with audio source 102.

At 504, link information associated with the first short-range wireless link is transmitted by primary wireless headphone 104 to secondary wireless headphone 106. As shown in FIG. 6, the link information may be SCO link information associated with the first SCO link between primary wireless headphone 104 and audio source 102. Any suitable information related to the first SCO link may be encapsulated into SCO data packages and transmitted to secondary wireless headphone 106. The SCO link information may include the connection parameters (e.g., the IP and/or MAC addresses), encryption parameters, and FHSS parameters with audio source 102.

At 506, the link information is received by secondary wireless headphone 106. At 508, a second short-range wireless link with the audio source is established by secondary wireless headphone 106 based on the link information. As shown in FIG. 6, secondary wireless headphone 106 receives the SCO link information from primary wireless headphone 104 and establishes a second SCO link based on the SCO link information by, for example, configuring the encryption parameters and FHSS parameters and setting up the communication environment to initiate the communication snooping. On the other hand, primary wireless headphone 104 notifies audio source 102 to start the audio communication. Once the second SCO link is established, secondary wireless headphone 106 transmit an acknowledgment message (ACK) to primary wireless headphone 104. Both primary and secondary wireless headphones 104 and 106 then use the same new FH table in the SCO link information. Secondary wireless headphone 106 also notifies audio source 102 to start the audio communication.

At 510, audio information is received by primary wireless headphone 104 from the audio source over the first short-range wireless link. At 512, the audio information over the first short-range wireless link is snooped by secondary wireless headphone 106 using the second short-range wireless link. As shown in FIG. 6, audio communications may be achieved between audio source 102 and primary wireless headphone 104 and between audio source 102 and secondary wireless headphone 106 at the same time. For example, voice data from audio source 102 may be received by primary wireless headphone 104 over the first SCO link and snooped by secondary wireless headphone 106 using the second SCO link. Since secondary wireless headphone 106 can snoop the audio communications between primary wireless headphone 104 and audio source 102, primary wireless headphone 104 no longer needs to relay the audio information received from audio source 102 to secondary wireless headphone 106. Thus, the power consumption of primary wireless headphone 104 can be reduced.

As shown in FIG. 6, once the audio communications with audio source 102 stop, primary wireless headphone 104 removes the first SCO link and notifies audio source 102 about the removal of the first SCO link. Primary wireless headphone 104 also transmits a message (stop snooping) to instruct secondary wireless headphone 106 to stop snooping. In response to receiving the stop snooping message, secondary wireless headphone 106 stops snooping, releases the snooping environment, and notifies audio source 102 about the end of snooping.

Figure 7:
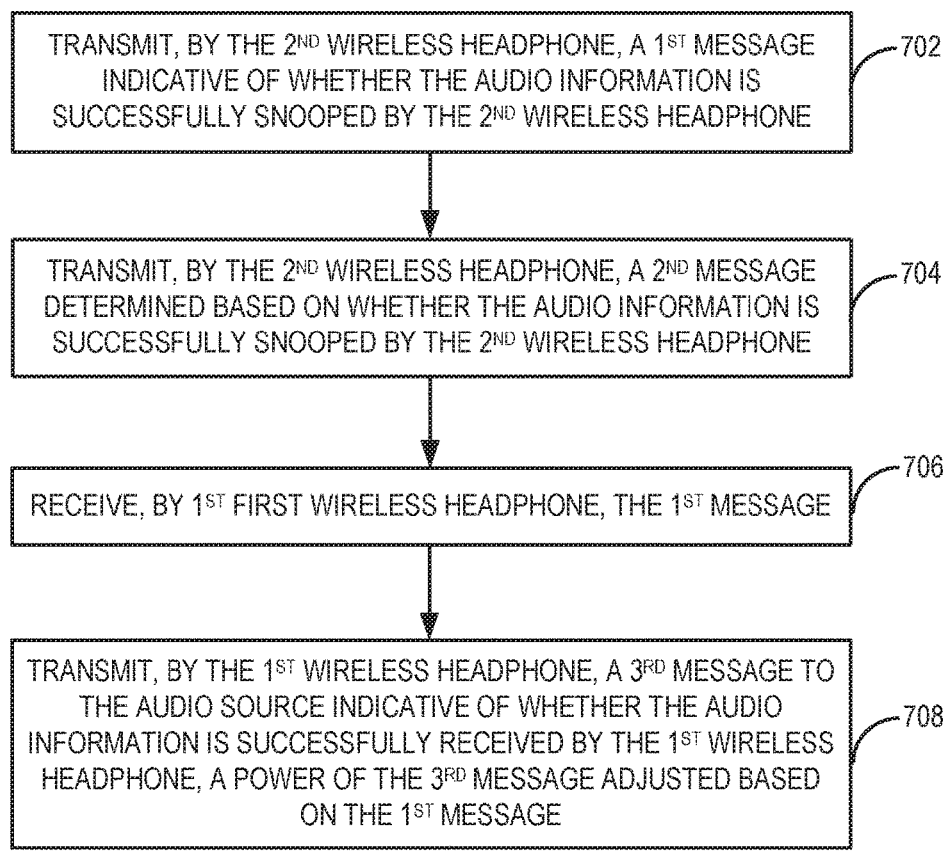
FIG. 7 is a flow chart illustrating an exemplary method for acknowledging wireless audio communication in accordance with an embodiment.

FIG. 7 is a flow chart illustrating an exemplary method 700 for acknowledging wireless audio communication in accordance with an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 7, as will be understood by a person of ordinary skill in the art. Method 700 will be described with reference to FIGS. 1 and 2. However, method 700 is not limited to that exemplary embodiment.

At 702, a first message indicative of whether the audio information is successfully snooped by secondary wireless headphone 106 is transmitted by secondary wireless headphone 106 to primary wireless headphone 104. For example, primary wireless headphone 104 may be in the normal mode, and secondary wireless headphone 106 may be in the snoop mode. At 704, a second message determined based on whether the audio information is successfully snooped by secondary wireless headphone 106 is transmitted by secondary wireless headphone 106 to audio source. In one example, a second message may be an interfering message (e.g., NACK, ACK_P, or interfering packages) when the audio information is not successfully snooped by secondary wireless headphone 106. In another example, a second message may be an acknowledgement message (e.g., ACK or ACK_P) when the audio information is successfully snooped by secondary wireless headphone 106.

At 706, the first message from secondary wireless headphone 106 is received by primary wireless headphone 104. At 708, a third message indicative of whether the audio information is successfully received by primary wireless headphone 104 is transmitted by primary wireless headphone to audio source. The power of the third message is adjusted based on the first message from secondary wireless headphone 106. For example, the power of the third message may be reduced to below the normal level when the first message indicates that secondary wireless headphone 106 does not successfully snoop the audio information from audio source 102. In this case, as secondary wireless headphone 106 fails to successfully snoop the audio information from audio source 102, the second message transmitted by secondary wireless headphone 106 to audio source 102 is an interfering message. By reducing the power of the third message transmitted by primary wireless headphone 104, the third message can be more easily interfered by the second message from secondary wireless headphone 106 with the normal power level. Whether audio source 102 can correctly receive the third message from primary wireless headphone 104 may be determined by whether the second message can interfere the third message at audio source 102. That is, the second message and the third message determine whether audio source 102 can receive the third message from primary wireless headphone 104 correctly. The detail of determining audio information re-transmission based on the combination of the acknowledgment messages from both primary and secondary wireless headphones in the normal mode and snoop mode, respectively, is disclosed in U.S. patent application Ser. No. 15/952,444, entitled "COMMUNICATION OF WIRELESS HEADPHONES," which is incorporated herein by reference in its entirety.

Figure 8:
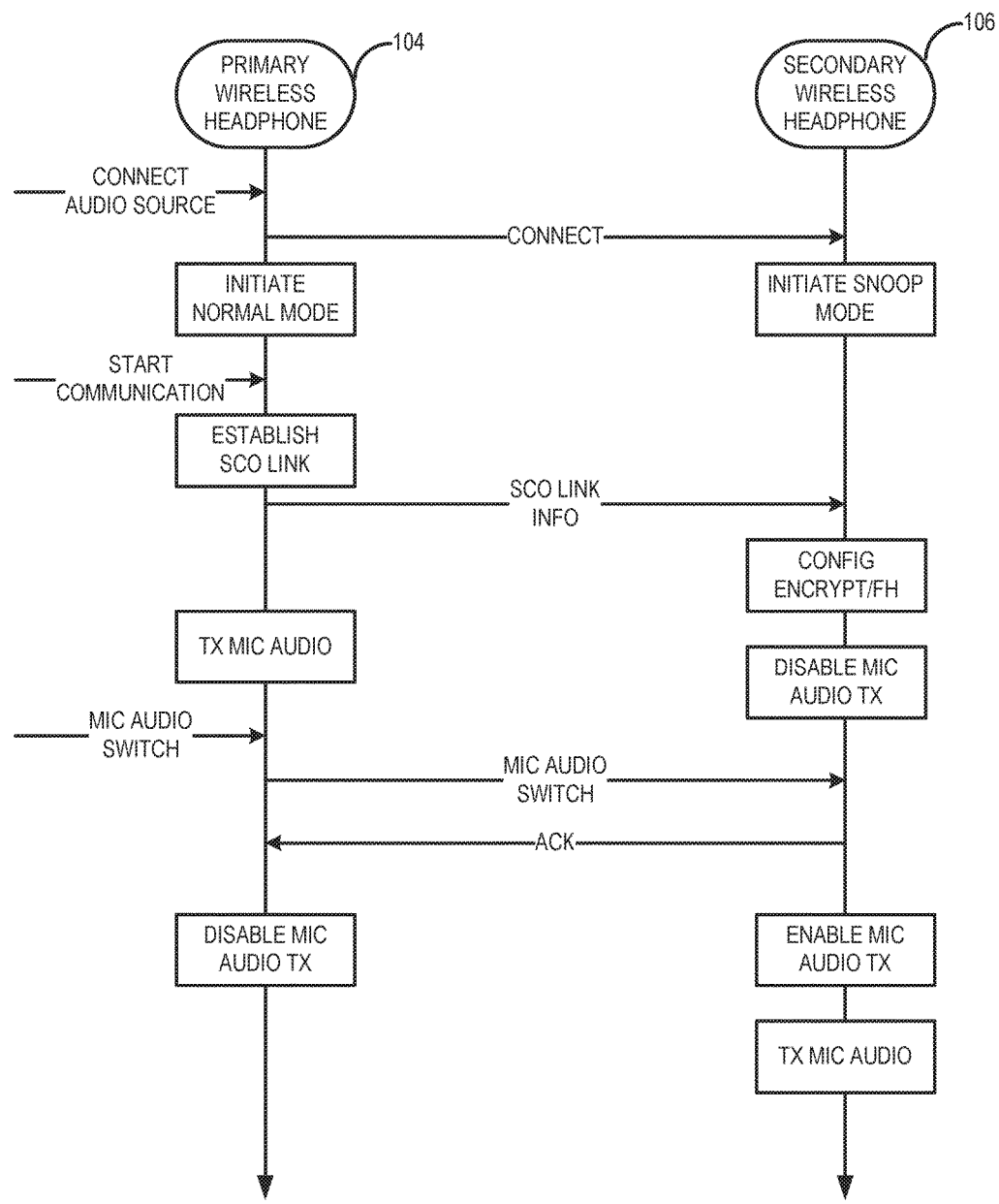
FIG. 8 is a timing diagram illustrating switch of microphone audio transmission between wireless headphones in accordance with an embodiment.

FIG. 8 is a timing diagram illustrating switch of microphone audio transmission between wireless headphones in accordance with an embodiment. In this example, each of primary and secondary wireless headphone 104 and 106 is combined with a respective microphone for collecting user voice during voice calls and generating voice data (microphone audio information) to be transmitted to audio source 102 during the voice calls.

Similar to the example illustrated in FIG. 5, a first SCO link and a second SCO link are established by primary wireless headphone 104 and secondary wireless headphone 106, respectively. Primary wireless headphone 104 works in the normal mode and thus, by default, enables its microphone audio information transmission to transmit first microphone audio information over the first SCO link. Certain conditions may trigger the switch of microphone audio information transmission between primary and secondary wireless headphones 104 and 106. For example, primary wireless headphone 104 may fall off from user's ear or become out of power so that the microphone with primary wireless headphone 104 cannot collect user's voice.

In response to the switch triggers, primary wireless headphone 104 transmits a switch message to secondary wireless headphone 106 instructing secondary wireless headphone 106 to enable its microphone audio information transmission. Secondary wireless headphone 106 transmits an acknowledgement message (ACK) to primary wireless headphone 104 in response to receiving the switch message. In response to receiving the ACK from secondary wireless headphone 106, primary wireless headphone 104 disables its microphone audio information transmission over the first SCO link. On the other hand, secondary wireless headphone 106 enables its microphone audio information transmission to start transmitting second microphone audio information, e.g. user voice data collected by its microphone, over the second SCO link. The switch of microphone audio information transmission between primary and secondary wireless headphones 104 and 106 illustrated in FIG. 8 can be done very fast, e.g., less than 50 ms, without active participation of audio source 102.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A wireless audio system, comprising:
a first wireless headphone configured to:
    establish a first short-range wireless link with an audio source;
    transmit, to a second wireless headphone, link information associated with the first short-range wireless link; and
    receive, from the audio source, audio information over the first short-range wireless link; and
a second wireless headphone configured to:
    receive, from the first wireless headphone, the link information associated with the first short-range wireless link;
    establish a second short-range wireless link with the audio source based on the link information; and
    snoop the audio information over the first short-range wireless link using the second short-range wireless link, wherein:
the second wireless headphone is further configured to:
    transmit, to the first wireless headphone, a first message indicative of whether the audio information is successfully snooped by the second wireless headphone; and
    transmit, to the audio source, a second message determined based on whether the audio information is successfully snooped by the second wireless headphone; and
the first wireless headphone is further configured to:
    receive, from the second wireless headphone, the first message; and
    transmit, to the audio source, a third message indicative of whether the audio information is successfully received by the first wireless headphone, a power of the third message adjusted based on the first message,
    wherein the second message and the third message determine whether the audio source can receive the third message correctly.

2. The wireless audio system of claim 1, wherein the first wireless headphone is further configured to repeatedly transmit, to the audio source, a negative acknowledge (NACK) message to cause the audio source to re-transmit the audio information until a number of re-transmission reaches a threshold.

3. The wireless audio system of claim 1, wherein:
the first wireless headphone is further configured to:
   transmit, to the audio source, first microphone audio information over the first short-range wireless link;
   transmit, to the second wireless headphone, a switch message instructing the second wireless headphone to enable microphone audio information transmission; and
   disable microphone audio information transmission in response to the second wireless headphone enabling microphone audio information transmission; and
the second wireless headphone is further configured to:
   receive, from the first wireless headphone, the switch message;
   enable microphone audio information transmission in response to receiving the switch message; and
   transmit, to the audio source, second microphone audio information over the second short-range wireless link.

4. The wireless audio system of claim 1, wherein each of the first and second short-range wireless links includes a synchronous connection oriented (SCO) link.

5. A method for snooping wireless audio communication, comprising:
   establishing, by a first wireless headphone, a first short-range wireless link with an audio source;
   transmitting, by the first wireless headphone, link information associated with the first short-range wireless link;
   receiving, by a second wireless headphone, the link information;
   establishing, by the second wireless headphone, a second short-range wireless link with the audio source based on the link information;
   receiving, by the first wireless headphone, audio information from the audio source over the first short-range wireless link;
   snooping, by the second wireless headphone, the audio information over the first short-range wireless link using the second short-range wireless link;
   transmitting, by the second wireless headphone, a first message indicative of whether the audio information is successfully snooped by the second wireless headphone;
   transmitting, by the second wireless headphone, a second message determined based on whether the audio information is successfully snooped by the second wireless headphone;
   receiving, by the first wireless headphone, the first message; and
   transmitting, by the first wireless headphone, a third message to the audio source indicative of whether the audio information is successfully received by the first wireless headphone, a power of the third message adjusted based on the first message,
   wherein the second message and the third message determine whether the audio source can receive the third message correctly.

6. The method of claim 5, further comprising repeatedly transmitting, by the first wireless headphone, a negative acknowledge (NACK) message to the audio source to cause the audio source to re-transmit the audio information until a number of re-transmission reaches a threshold.

7. The method of claim 5, further comprising:
   transmitting, by the first wireless headphone, first microphone audio information to the audio source over the first short-range wireless link;
   transmitting, by the first wireless headphone, a switch message instructing the second wireless headphone to enable microphone audio information transmission;
   receiving, by the second wireless headphone, the switch message;
   enabling, by the second wireless headphone, microphone audio information transmission in response to receiving the switch message;
   disabling, by the first wireless headphone, microphone audio information transmission in response to the second wireless headphone enabling microphone audio information transmission; and
   transmitting, by the second wireless headphone, second microphone audio information to the audio source over the second short-range wireless link.

8. The method of claim 5, wherein each of the first and second short-range wireless links includes a synchronous connection oriented (SCO) link.

* * * * *